US012798215B2

(12) United States Patent
Strignano et al.

(10) Patent No.: US 12,798,215 B2

(45) Date of Patent: Nov. 17, 2026

(54) PLATE IN COMPOSITE MATERIAL, MULTILAYER WITH HIGH THREE-DIMENSIONAL DEFORMABILITY

(71) Applicant: RENOLIT GOR S.P.A., Buriasco (IT)

(72) Inventors: Andrea Strignano, Buriasco (IT); Simone Collino, Buriasco (IT)

( * ) Notice: Subject to any disclaimer, the term of this patent is extended or adjusted under 35 U.S.C. 154(b) by 231 days.

(21) Appl. No.: 18/707,864

(22) PCT Filed: Nov. 8, 2022

(86) PCT No.: PCT/IB2022/060717

§ 371 (c)(1), (2) Date: May 6, 2024

(87) PCT Pub. No.: WO2023/079533

PCT Pub. Date: May 11, 2023

(65) Prior Publication Data

US 2025/0367908 A1 Dec. 4, 2025

(30) Foreign Application Priority Data

Nov. 8, 2021 (IT) ........................ 102021000028346

(51) Int. Cl.

*B32B 27/32* (2006.01)
*B32B 5/02* (2006.01)
*B32B 7/027* (2019.01)

(52) U.S. Cl.

CPC .............. *B32B 7/027* (2019.01); *B32B 5/022* (2013.01); *B32B 5/024* (2013.01); *B32B 27/32* (2013.01); *B32B 2262/101* (2013.01); *B32B 2307/3065* (2013.01); *B32B 2307/546* (2013.01); *B32B 2307/718* (2013.01); *B32B 2307/7376* (2023.05)

(58) Field of Classification Search

None
See application file for complete search history.

(56) References Cited

U.S. PATENT DOCUMENTS

2015/0218371 A1* 8/2015 Lee ......................... C08L 69/00 524/494
2019/0152212 A1* 5/2019 Tseng .................. B29B 17/0026

FOREIGN PATENT DOCUMENTS

EP 3756866 12/2020
WO 2017134496 8/2017

* cited by examiner

*Primary Examiner* — Sheeba Ahmed

(74) *Attorney, Agent, or Firm* — Themis Law

(57) ABSTRACT

A multilayer composite plate or panel includes a first layer of a thermoplastic material coupled to another material layer adhering to the first layer with a chemical or physical process. The first layer includes a mixture made from a matrix of a thermoplastic material, in particular of the polyolefin family, and non-vegetal fibers or particles with an aspect ratio greater than 9, preferably 10-12 in the case of needle-like fibers or 40-70 in the case of lamellar particles, which are present as groupings or bundles having a predetermined length and forming a three-dimensional structure of contiguous elements layered together. The second layer has a coating that includes synthetic or natural fibers bonded together mechanically or with a physico-chemical process.

17 Claims, 2 Drawing Sheets

Figure 1:
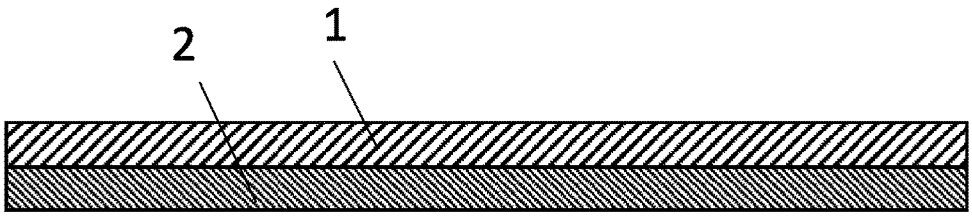

PLATE IN COMPOSITE MATERIAL, MULTILAYER WITH HIGH THREE-DIMENSIONAL DEFORMABILITY

The invention relates to a plate of composite material, multilayer, wherein there is at least a first layer of composite material and at least one further layer of material which is coupled to at least one face of said first layer by chemical/physical adhesion.

The term "composite" means a material obtained by combining two or more components, also called phases, said components being combined in various proportions and forms, so that the final product has a non-homogeneous microstructure and chemical/physical properties different from those of the individual constituents.

One of the phases, called matrix, is in continuous form, and its scope is mostly to contribute to the properties of the material and to bind the reinforcing phase(s), to ensure a certain shape to the piece, as well as to protect and uniformly transfer the load to the other reinforcing phase.

The so-called reinforcing phase, on the other hand, consists of a discontinuous component, usually fibrous or particulate, whose task is to ensure stiffness and mechanical resistance, taking on itself most of the external load.

The basic idea of composites is to optimise, in terms of chemical-physical mechanical and lightweight properties, the performance of so-called conventional materials.

In fact, by combining a material with a certain property (e.g. a polymer) with another material with different properties (e.g. carbon fibres), it is possible to obtain a material, composed of the two (or more than two) materials, which brings out the best properties. Composite materials are particularly interesting because they offer combinations of different properties that cannot be present simultaneously in traditional materials such as metal alloys, ceramic materials, and polymers.

From document WO2017134496A1, a plate of material or a panel of thermoformable composite material is known which is obtained by extrusion of a compound composed of at least one thermoplastic material, in particular of the polyolefins family, and mineral fibres having predetermined dimensional properties (diameter and length). The extrusion process is carried out with parameters such as to generate in the plate a three-dimensional structure incorporated in the thermoplastic material.

This type of plate has proven to have excellent impact strength (with reference to Charpy) and a relatively lightweight. In addition, the material can be formed by moulding processes.

The mechanical properties of the material, such as flexibility, weight, impact strength and thermoformability are determined both by the ratio of mineral fibres to polymer material and by the particular type of polymer material and fibres. Varying these parameters results in plates with higher flexibility and/or higher impact strength and/or lower weight. Combinations of these parameters are chosen to optimise one of the above properties without compromising the other properties or at least limiting the reduction in relation to the other properties.

However, the currently possible compromise solutions do not allow to achieve desired conditions of high deep-drawability, stiffness, impact strength and lightweight.

The current state of art of the material plates mentioned above do not allow for thermoformable materials with high mechanical strength, in particular high impact strength (according to the Charpy measurement system), and which at the same time are thermoformable, i.e. have the possibility of being shaped three-dimensionally by conventional moulding processes.

In some applications, the forming requirements involve for drawing with cross-stretching values (in both directions) greater than or at least equal to 50%, while maintaining acceptable flexural stiffness together with a low weight per unit area, good dimensional stability and good impact strength.

In some applications, the strain in the direction perpendicular to the extension of a plate reaches considerable values with respect to the thickness of the plate itself, such as in the order of magnitude greater than ten, preferably greater than 50, in some cases greater than 100 times the thickness of the plate.

Materials of this type are not currently known, and while some of them make it possible to approach the desired properties of, for example, three-dimensional deformability, they are lacking or poor in relation to other properties such as mechanical strength, stability over time and/or low weight or resistance to aggressive chemical/physical agents, such as heat, fire or other extreme environmental influences.

The term deep drawing refers to the transformation process of the material by means of hot-forming processes at least according to current forming technologies, overcoming, by means of the material properties, the fact that such three-dimensional deformations can generate phenomena of more or less localised stretching and therefore excessive thickness reduction and local weakening in the thermoformed product.

The term good dimensional stability refers to the climatic ageing conditions foreseen by the various standards and which vary according to the type of use and the type of product made with the said plate, typically foreseeing climatic conditions that can be reached inside the passenger compartment, the luggage compartment or on the external surfaces of motor vehicles. Such conditions of use may comprise the realization, with said plate, of constructive parts of machines and/or structures and/or the realization of accessories for which certain properties of resistance to temperature and humidity are foreseen, such as walls, partitions, boxes, doors or other fire resistant products.

In the present description and claims, the term fibres and/or the term fillers is used synonymously to denote both elongated or threadlike fibres and laminated fibres.

The present invention has the aim of producing a multilayer plate of the type described above, which plate allows simultaneous optimization of conflicting properties, such as in particular: limited weight, increased mechanical strength and, in particular, good impact strength and stiffness, which make it possible to use it in the coatings applications, for example for car interiors, with particularly demanding geometric properties, i.e. with strain in a direction perpendicular to the bidimensional extension of a starting plate which are up to an order of magnitude of at least 10, preferably 50 and in some cases even up to 100 times the thickness of a starting plate, said three-dimensional deformations being obtainable by achieving a capacity to be three-dimensionally deformable by means of thermoforming processes, all of which also makes it possible to have plate formulations having a high degree of recyclability.

The material referred to in the application WO2017134496A1 has been widely studied with respect to the type of polymeric material, the type of mineral fibres and the quantitative ratio between polymeric material and mineral fibres, and also with respect to the parameters of the intended extrusion process. Despite the fact that these studies have shown that this material and the plate obtained by extrusion present a wide range of combinations of alternatives relating to different ratios of properties such as mechanical impact strength, bending strength, weight and resistance to temperature and humidity, the aforementioned various composition alternatives have not made it possible to obtain combinations of these parameters that meet current requirements and in particular combinations of relative parameters that can allow the manufacture of three-dimensional elements with high deep drawing properties in combination with good stiffness and lightweight.

In relation to the weight of the material and the ease of forming, the scope of the present invention is to produce a three-dimensional formable material.

It is also clear that, from the point of view of environmental impact, a plate of polymeric material with these properties should be highly recyclable even with simpler procedures compared to the recycling of other materials and with lower energy costs.

Accordingly, the invention solves the problem posed by a plate or panel of composite material comprising at least a first layer of thermoplastic material which is coupled on at least one face with at least one coating layer by means of chemical-physical adhesion, and wherein said first layer of thermoplastic material consists of a mixture composed of a matrix of a thermoplastic material, in particular of the polyolefin family, and non-vegetal fibres or particles having a predetermined ratio of at least two dimensions in non-parallel directions, so-called aspect ratio, and forming a three-dimensional structure of fillers in the form of fibres or particles;

and wherein said further coating layer comprises at least one polymeric coating layer comprising a film of polyolefin material and/or at least one further coating layer comprising a layer based on synthetic or natural fibres mechanically bonded together or by other physico-chemical processes, said further coating layer being applied to at least one face of said first layer.

According to a feature, said further coating layer may comprise a layer of woven or non-woven fabric or other mats or webs or agglomerates of similar fibres and comprise natural or synthetic fibres.

According to an embodiment, said non-vegetal fibres and/or said particles comprising said first layer are present in the polymer matrix material in the form of groupings or bundles having a predetermined length and forming a three-dimensional structure of contiguous elements layered together.

In an embodiment, said fibres or particles comprise elongated fibres which are especially glass-based filiform and/or needle-like.

In an embodiment, said fibres or particles comprise needle-like carbon-based fibres.

In an embodiment, in needle-shaped fibres, the ratio of the largest dimension, i.e. the longitudinal dimension, to the smallest dimension, i.e. the diametric dimension, is at least 9, on average 11 and at most 400.

In an embodiment, said particles consist of lamellar particles based on mica or similar materials such as, for example, lamellar particles of vermiculite, graphite or lamellar fibres having a thickness of nanometre or the thickness of one atom or several atoms forming the crystalline lattice of said lamellar fillers or combinations or sub-combinations of said lamellar fillers or fibres.

In relation to the lamellar fillers, the ratio of a major dimension to a minor dimension is also a minimum of 9, an average of 60 and a maximum of 200.

In an embodiment, said needle-shaped fillers are mixed with particle-shaped fillers respectively comprising needle-shaped glass fibres and lamellar fibres of mica or similar materials.

According to a preferred embodiment, the thermoplastic material of which said first layer is formed is at least compatible, preferably identical to the material of which the fibres of said further polymeric coating layer are formed.

An embodiment variant provides for the thermoplastic material of said first layer and for the fibres and/or particles of said further polymeric coating layer the same material such as in particular a polyolefin resin or a blend of polymers and/or polyolefin copolymers, for example polypropylene.

According to an embodiment, when the main properties are directed towards high thermoformability while maintaining good stiffness and low weight, said further polymeric coating layer is in turn formed by a first coating layer consisting of a polyolefin polymer, preferably polypropylene, optionally with reinforcing fillers, said first coating layer being laminated to a second coating layer adhered to said first coating layer by means of a mechanical-physical bond and comprising a non-woven fabric based on synthetic fibres in the form of filaments and/or needles, preferably based on polyester or polyamide; said fibres forming a weave in which the individual filaments are twisted and bound together by a mechanical process.

The thicknesses of the first layer, referred to hereinafter and in the claims, as the first composite layer and of the fibrous coating layer coupled to said first composite layer may vary and may be of the order of 0.3 to 2 mm for the first composite layer, while the second layer, i.e., the first coating layer may be of the order of 0.1 to 4 mm.

The second fibrous coating layer of said first composite layer may be contemplated coupled respectively to each of the two opposite faces of said first composite layer.

In this case, the thickness of said two facing layers coupled to the two opposite faces of said first composite layer may be, identical or even different from each other, depending on the requirements relating to the desired mechanical, weight, deformability and aesthetic or acoustic properties.

According to an embodiment, when a high mechanical impact strength is required in combination with a thermoformability capability and a high fire resistance according to the fire regulations for the specific application, a layer also having a firewall function is applied to at least one face of said first composite layer in addition to said cladding layer or as an alternative to said cladding layer.

In an embodiment, said firewall layer may comprise a layer of non-woven fabric formed from oxidised polyacrylonitrile fibres.

In an embodiment, said firewall layer may also be provided coupled to both faces of the first layer, alternatively or in combination with a corresponding polymeric coating layer according to one or more of the embodiments and variations described above.

Depending on whether, in the particular type of use of the plate and/or of the construction or structural part manufactured from said plate, requirements of mechanical strength and/or thermoformability and/or reduced weight and/or recyclability and/or fire resistance prevail, it is possible to vary the number and type of polymeric and/or fibrous coating layers and/or firewall layers coupled to one or both faces of the first composite layer.

These layers may be provided with different thicknesses and in combinations that provide for two or more of said coupled layers overlapping each other, also in an alternating manner as regards the type of polymeric, fibrous coating layer and firewall layer.

General solutions relating to possible variations are for example and not limited to:

Coupled to one face of said first composite layer, at least one leaf having a predetermined thickness of a coating layer and no further layer coupled to the opposite face of said first composite layer;

At least one plate of a polymeric coating layer of a given thickness laminated to each of the two opposite faces of said first composite layer;

At least one firewall layer of specified thickness laminated to only one side of said first composite layer;

At least one plate of a polymeric coating layer of a given thickness laminated to one face of said first composite layer, and at least one firewall layer of a given thickness laminated to the opposite face of said first composite layer;

At least one firewall layer of a predetermined thickness laminated to both opposite faces of said first composite layer;

At least one plate of a polymeric cladding layer of a given thickness and at least one firewall layer laminated to each other overlapping at least one or both faces of said first composite layer, the polymeric cladding layer being the outermost layer or vice versa, the firewall layer being the outermost layer;

At least one plate of a polymeric coating layer having a predetermined thickness and at least one firewall layer laminated together overlapping one of the faces of said first composite layer, the polymeric coating layer being the outermost layer or vice versa the firewall layer being the outermost layer and at least one polymeric coating layer or alternatively at least one firewall layer laminated to the opposite face of said first composite layer or no layer being laminated to said opposite face of said first composite layer.

With regard to the thicknesses of the first composite layer, the polymeric coating layer (s) and the firewall layer(s), the thicknesses are best expressed in the weight equivalent per unit area, for example in grams per square metre, and are given in the following list:

for the first layer of composite material: 400 to 1800 g/m$^2$;

for the woven or other interwoven or bonded fibre covering layer(s): 30 to 200 g/m$^2$; and For the polymeric film layer: 20 to 150 g/m$^2$;

for the fire protection layer(s): 80 to 200 g/m$^2$.

The arrangement and thicknesses obviously depend on the different combinations of the above layers and the intended use of the plate or panel.

For applications requiring thermoforming at a high depth of drawing, the plate according to a preferred embodiment of the present invention comprises:

A first composite layer with a thickness expressed in g/m$^2$ between 400 to 1800 g/m$^2$ to one of whose faces is coupled a layer based on synthetic or natural fibres mechanically bonded together or through other chemical-physical processes with a thickness between 30-200 g/m$^2$.

In an embodiment comprising coupling during thermoforming of a further coating layer on one face of the plate according to the above embodiment, a polymeric film with a thickness of between 20-150 g/m$^2$ is coupled to at least one face of the first composite layer. Said polymeric coating layer may have a function as an adhesive or as a compatibilizing agent between said first composite layer and said further coating layer.

An embodiment comprising a first composite layer having a thickness expressed in g/m$^2$ ranging from 400 to 1800 g/m$^2$ to one of whose faces is coupled a coating layer based on synthetic or natural fibres mechanically bonded together or by means of other chemical-physical processes having a thickness ranging from 30-200 g/m$^2$ and a polymeric film having a thickness ranging from 20-150 g/m$^2$ on the opposite face of said first layer for coupling in the drawing phase of a further coating layer on said film.

A further embodiment, which provides properties of combustion resistance, always maintaining properties of thermoforming even if slightly reduced with respect to the preceding embodiments, comprises a first composite layer with a thickness expressed in g/m$^2$ ranging from 400 to 1800 g/m$^2$, being to one or to both faces of said first composite layer coupled an flame retardant layer made of fabric or other agglomerate of fibres mechanically bound together or by means of chemical-physical processes with a thickness ranging from 80 to 200 g/m$^2$.

The above examples are not to be considered as limiting or exhaustive, since it is possible to create combinations of the above configurations according to one or more of the variants already listed above, and further variations are also possible, which may provide the coupling of two or more covering layers or the alternation of two or more first composite layers with two or more covering layers that are identical to each other or produced according to the different forms of execution described, all depending on the mechanical strength properties, three-dimensional thermoforming behaviour, weight and resistance to external agents such as fire.

Regarding said first layer of composite material, in accordance with the sense of the present invention as defined above, said layer may have various properties.

In an embodiment, said three-dimensional structure of the first layer comprises fibres which are three-dimensionally arranged by the mechanical action exerted by the extrusion on said fibre packages.

Said fibres may be alternatively or in combination with each other elongated, threadlike and/or needle-like fibres or lamellar fibres.

In a further embodiment, said three-dimensional fibre structure presents a ratio of the distribution of the fibres, in particular elongated fibres, and/or of the lamellar charges, alternatively or in combination with each other, having an orientation parallel to the faces of the layer and/or to the direction of extrusion with respect to the fibres oriented in a direction perpendicular to the faces of the plate, i.e. to the extrusion direction, which varies along the depth of the plate in the thickness direction of said layer, while the lamellar charges present a homogeneous orientation along the entire thickness.

According to an embodiment which may be provided in any combination or sub-combination with one or more of the preceding features, the percentage of the distribution of the orientations of the fibres, in particular elongated, threadlike and/or needle-like, relative to the faces of the plate and/or the direction of extrusion is in the range from 1:1 to 6:1.

In an exemplary and non-limiting embodiment, it is contemplated that about more than half, in particular more than 60% of the number of fibres within a layer of said first composite layer forming the surfaces of said first composite layer in correspondence with the two opposite faces thereof, has an orientation between a direction of about +60° to −60, in particular from +45° to −45° relative to the extrusion direction, the ratio of the percentage distribution of the orientation of the fibres relative to the extrusion direction, between an orientation of the fibres along the directions at +60° or −60°, preferably at +40° to −40° relative to the direction of extrusion and an orientation of the fibres parallel to the direction of extrusion being between a ratio value of 1:1 and a value of said ratio of 6:1.

With respect to the manufacturing process of the plate according to one or more of the preceding embodiments, in an embodiment of said process, the one or more layers of polymer coating and/or firewall are applied to said first layer by lamination, for example hot-rolling.

Depending on the combinations provided according to the various embodiments, it is possible to obtain boards having an impact strength sufficient to withstand impact forces of 100 Joules and higher.

As far as the polymeric coating layer is concerned, this can be a thin film for aesthetic and/or protective purposes and/or for adhesion of further layers of material.

As for the firewall layer, such a material is manufactured using commercially available fibres under the trade name PANOX® produced for example by SGL Carbon GmbH.

According to yet another preferred embodiment, the said plate may be laminated on at least one or both faces of an intermediate core layer, preferably of thermoplastic material. One embodiment envisages that this core layer is made of honeycombs whose axes are oriented transversely to the faces and which may be closed on one or both sides of the base.

According to an embodiment, the plate on one face may be made according to one of the preceding embodiments and the plate on the opposite face may be made according to a different embodiment chosen from among said one or more different embodiments of the plate.

Further features are the subject of the independent claims.

FIGS. 1 to 7 schematically show a cross-section of various exemplary, non-limiting, alternative embodiments of a plate according to the present invention.

Figure 8:
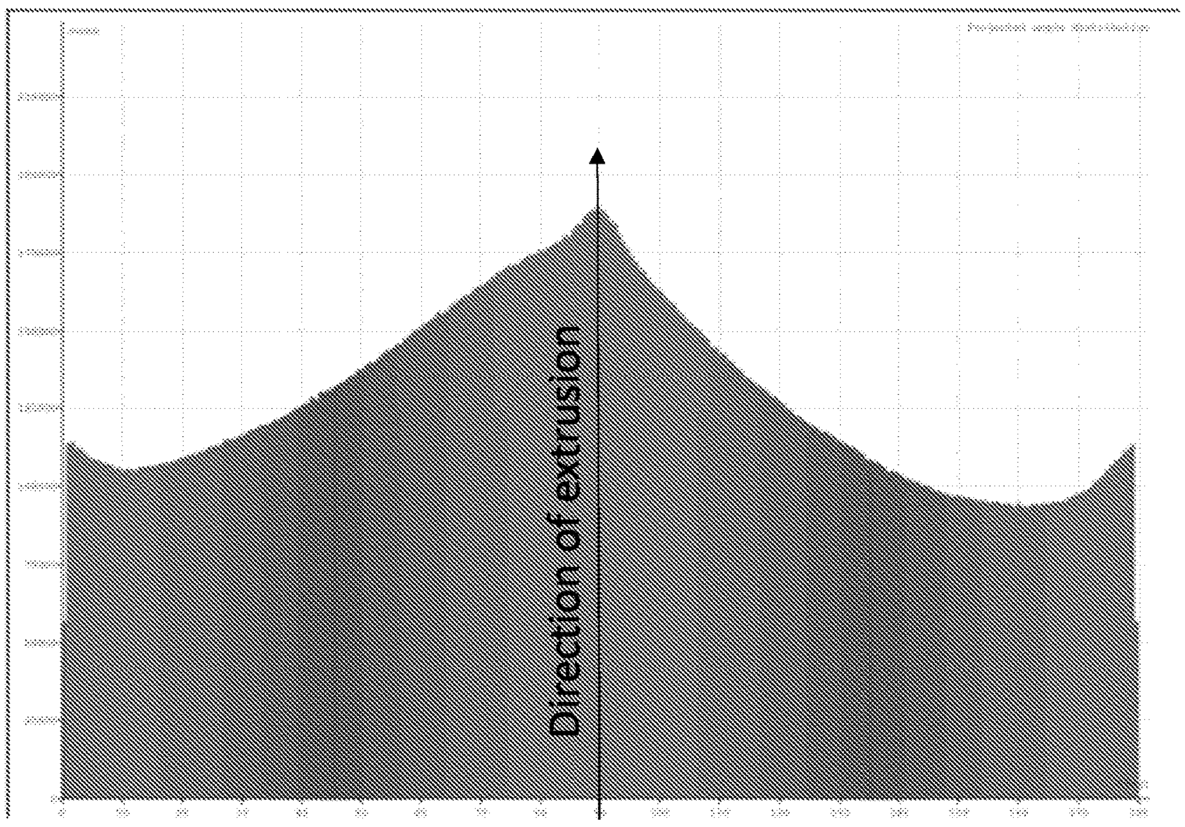

FIG. 8 shows in a graph the result of the analysis of the orientation of the fibres with respect to the extrusion direction in which the extrusion direction corresponds to the value 90 and is indicated by the axis extrusion direction and along a direction from the surface towards the centre of the composite state. The area of the curve between 45° and 135° (+45° and −45° with respect to the direction of extrusion corresponding to 90°) certainly indicates a percentage quantity of fibres with orientations in the said directional range that is more than half and in particular 60% of the total fibres.

FIG. 1 shows a plate consisting of a first layer of composite material 1 to which a layer 2 is coupled on one face.

According to an embodiment of the present invention, the first layer 1 is the layer defined above as the first composite layer and is made by extruding a mixture of a thermoplastic polymeric material and fibres according to one or more of the variants described above, namely:

- non-vegetal fibres or particles having an aspect ratio between at least one of the dimensions and at least one of the other dimensions greater than 9, preferably from 10 to 12 if needle-shaped fibres or from 40 to 70 if lamellar particles, present in the form of groupings or bundles having a predetermined length and forming a three-dimensional structure of contiguous elements layered together and wherein said second layer comprises a coating based on synthetic or natural fibres mechanically bound together or by other chemical-physical processes.

Such fibres may for example be glass fibres which are oriented in two directions, one of which is parallel to the faces of the layer and the other perpendicular to said faces, while the lamellar particles may be made of mica, vermiculite, graphite or other materials.

In a preferred embodiment, the polymeric material comprises polyolefins and especially polypropylene, while said three-dimensional structure of the first layer comprises fibres which are arranged three-dimensionally by the mechanical action exerted by the extrusion on said fibre packages.

In a preferred exemplifying configuration, said three-dimensional fibre structure exhibits a ratio of the distribution of fibres and/or lamellar charges having an orientation parallel to the faces of the plate and/or the direction of extrusion to the distribution of fibres oriented in a direction perpendicular to the faces of the plate, i.e. the direction of extrusion, which varies along the depth of the plate in the direction of the thickness thereof from the outer faces towards the centre.

The fibres, i.e. the lamellar fillers, on the other hand, due to their lamellar conformation have a homogeneous orientation along the entire thickness of the plate, i.e. of the so-called composite layer 1.

In an embodiment, the percentage of the distribution of the fibre orientations relative to the faces of the plate and/or the direction of extrusion is in the range from 1:1 to 6:1.

Preferably, a non-limiting embodiment provides that about more than half, in particular more than 60%, of the number of fibres within a layer of said first composite layer forming the surfaces of said first composite layer at the two opposite faces thereof, have an orientation between a direction of about +60° to −60, in particular from +45° to −45° relative to the direction of extrusion, the ratio of the percentage distribution of the orientation of the fibres relative to the direction of extrusion, between an orientation of the fibres along the directions at +60° or −60°, preferably at +40° to −40° relative to the direction of extrusion and an orientation of the fibres parallel to the direction of extrusion being between a ratio value of 1:1 to a value of said ratio of 6:1.

An example of a first layer may also be made according to one or more of the alternatives described in application WO2017134496A1.

Regarding the layer of material 2 coupled to said first layer 1, the coupling may take place by chemical-physical adhesion in a hot or cold lamination process depending on the type of material of which the layer 2 is made.

As described above, the coating layer 2 may be made from various materials and from one or more layers overlapping each other. This coating layer may be applied to only one face of the first layer or to both faces of the first layer and may be substantially identical on the two faces or different from one face to the other.

In the embodiment of FIG. 1, the coating layer 2 may comprise polymeric material, and therefore said layer is referred to as a polymeric coating layer.

In particular, different types of polymers may be provided. Preferably, said polymeric coating layer may comprise the same material as the first composite layer 1. With reference to the preferred embodiment of the composite layer 1 comprising polyolefins and in particular polypropylene as polymeric material, in this case, the polymeric coating layer 2 comprises polyolefins or polypropylene.

The choice of using the same material for both layers 1 and 2 makes the plate recyclable to a very high degree.

In this layer composition, the plate exhibits very good impact strength in tests according to the Charpy method in combination with very good thermoformability using well-known thermoforming processes and in combination with a low specific weight. From the point of view of fire resistance, the plate has a relatively low level of fire resistance.

Figure 2:
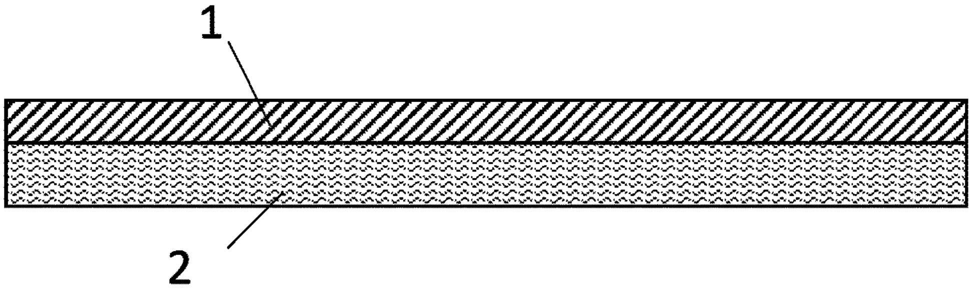

In an alternative embodiment, FIG. 2, the cladding layer 2 is configured to provide a firewall effect and comprises a non-woven fabric "mat" which is formed from fibres of fire retardant material and which in the preferred embodiment comprises oxidised poly acrylonitrile fibres.

Said "mat" is also laminated to at least one face of the first layer.

A "mat" of these fibres is marketed using fibres with the name PANOX® marketed by the company SGL CARBON.

In this plate composition, the plate still has a high thermoformability. However, the mat of oxidised polyacrylonitrile fibres has a high firewall effect and therefore the plate essentially retains the characteristics of high impact strength according to the Charpy test, but the lower thermoformability is compensated by a high fire resistance, while at the same time the weight remains low compared to known plates with similar impact strength and in this case fire resistance properties.

Different thicknesses can be provided for layer 1 and layer 2 in the different configurations of layer 2 as polymeric cladding layer, fibre cladding layer and firewall layer.

The following table provides some indications of the ranges of values for these thicknesses expressed in $g/m^2$.

| | Minimum thickness | Maximum thickness |
|---|---|---|
| Layer 1 | | |
| Polypropylene and glass fibre composite | 400 | 1800 |
| Layer 2 | | |
| Polymeric coating layer in the form of a film | 20 | 150 |
| A polymeric coating layer in the form of a woven fabric or agglomerate of fibres interwoven or bonded by chemical and physical processes. | 30 | 200 |
| Fire barrier layer | 80 | 200 |

Examples of these variants are given below:

Example 1

Thermoformable Plate with High Deep-Drawing and Impact Strength According to the Charpy Test The plate is composed according to the sketch of FIG. 2 of a composite layer 1 of polymeric material consisting of polypropylene and wherein glass fibres are mixed.

The composite layer 1 has a surface weight of 1050 $g/m^2$. The coating layer 2 comprises a non-woven fabric of synthetic fibres with a surface weight of 150 $g/m^2$. The minimum drawability achieved in the thermoforming process is 50% in both directions (longitudinal and transverse to the manufacturing direction).

The stiffness value measured as the flexural modulus of composite layer 1 is 6800 MPa in the longitudinal direction and 2200 MPa in the transverse direction (according to ISO 178 method). The impact strength value is greater than 27 $KJ/m^2$ in the longitudinal direction and "No Break" in the transverse direction (according to ISO 179 method).

Example 2

Figure 5:
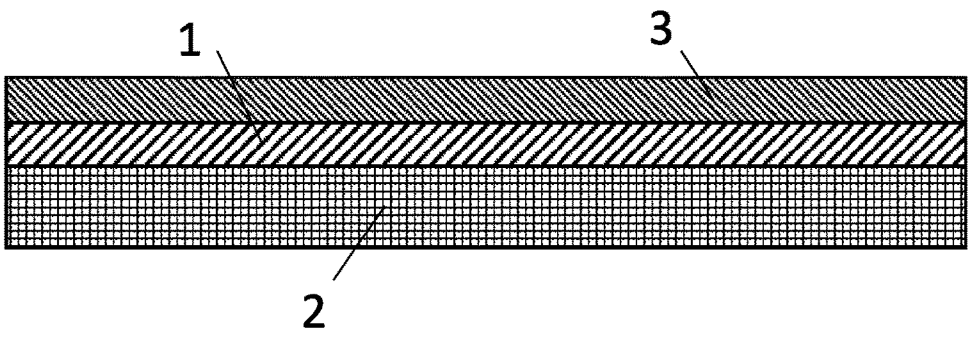

Thermoformable Plate with High Deep-Drawing and Impact Strength According to the Charpy Test The plate is composed, according to the sketch in FIG. 5, of a composite layer 1 of polymeric material consisting of polypropylene and glass fibres mixed in.

Said composite layer 1 has a surface weight of 1050 $g/m^2$. The coating layer 2 comprises a polymeric film having a surface weight of 50 $g/m^2$. The coating layer 3 on the opposite side of the composite state 1 comprises a non-woven synthetic fibre fabric having a surface weight of 150 $g/m^2$. The minimum deep-drawability achieved in the thermoforming process is 50% in both directions (longitudinal and transverse to the direction of production).

The stiffness value measured as the flexural modulus of composite layer 1 is 6800 MPa in the longitudinal direction and 2200 MPa in the transverse direction (according to ISO 178 method). The impact strength value is greater than 27 $KJ/m^2$ in the longitudinal direction and "No Break" in the transverse direction (according to method ISO 179).

The coating layer 2 of polymeric film, of the same nature as the polymeric matrix of the composite layer 1, can be used, without negatively affecting the other properties, to thermally sealed an additional surface layer.

As is schematically apparent from FIGS. 3, 5, 6, 7, a coating layer may be applied to both faces of the first composite layer 1. In this case, the two coating layers are indicated respectively by 2 and 3. Coating layer 2 has thicknesses which may be identical or different depending on the material type of layers 1 and 2 and the required properties of the plate.

Example 3

Thermoformable Plate with High Deep-Drawing and Low Surface Weight

Figure 6:
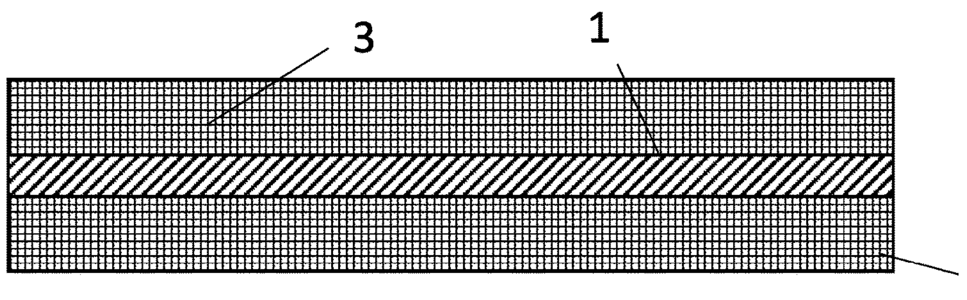

The plate is composed, according to the scheme in FIG. 6, of a composite layer 1 of polymeric material consisting of polypropylene and glass fibres mixed in it.

Said composite layer 1 has a surface weight of 600 $g/m^2$.

The coating layer 2 coupled to one of the faces of the composite layer 1 comprises a non-woven fabric of synthetic fibres having a surface weight of 200 $g/m^2$. The covering layer 3 laminated to the opposite face of the composite layer 1 comprises a non-woven synthetic fibre fabric having a surface weight of 80 $g/m^2$.

The minimum deep-drawability achieved in the thermoforming process is equal to 45% in both directions (longitudinal and transverse with respect to the direction of production).

The combustion speed value, measured as flame propagation speed in mm/min (according to DIN 75200 method) is 45 mm/min.

Example 4

Thermoformable Plate with High Deep-Drawing, Low Surface Weight and Low Burning Speed.

Figure 7:
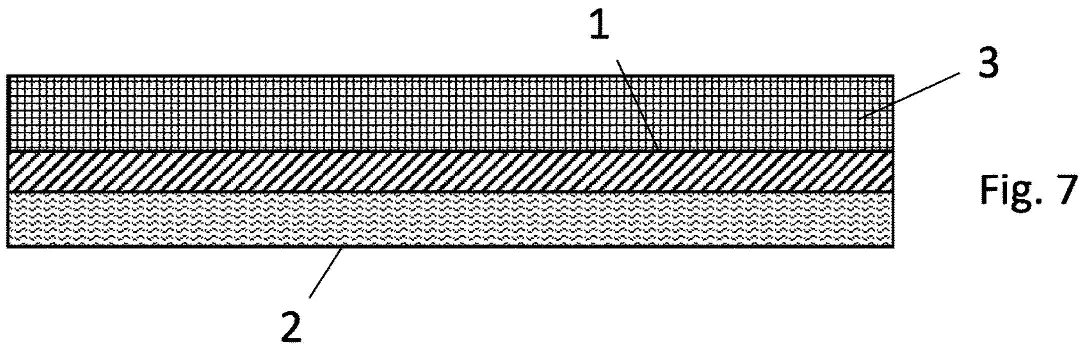

The plate is composed according to the scheme in FIG. 7 of a composite layer 1 of polymeric material consisting of polypropylene and in which needle-like or filiform glass fibres are mixed.

The composite layer 1 has a surface weight of 600 $g/m^2$. The coating layer 2 coupled to one of the faces of the composite layer 1 comprises a non-woven fabric of synthetic fibres having a surface weight of 200 $g/m^2$. The covering layer 3 laminated to the other of the faces of the composite layer 1 comprises a non-woven fabric of flame-retardant fibres having a surface weight of 120 g/m$^2$.

The minimum deep-drawability achieved in the thermoforming process is equal to 40% in both directions (longitudinal and transverse with respect to the direction of production).

The combustion speed value, measured as flame propagation speed in mm/min (according to DIN 75200 method) is 17 mm/min.

Example 5

Thermoformable Plate with High Deep-Drawing, Low Surface Weight and Low Burning Speed.

Figure 3:
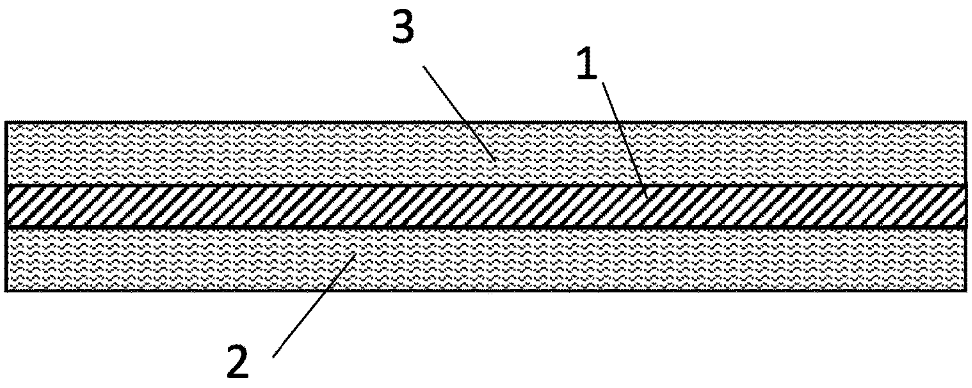
Figure 4:
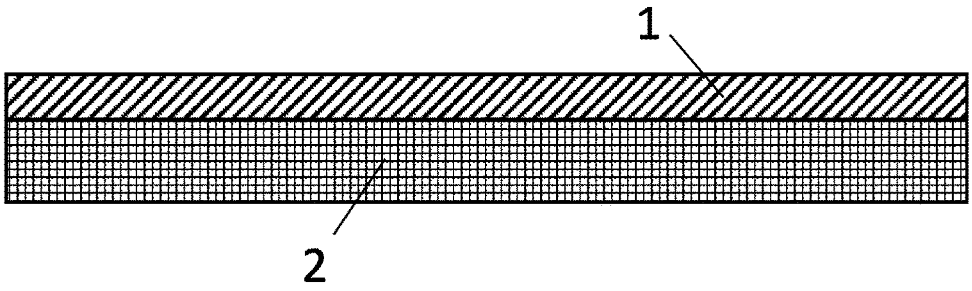

The plate is composed according to the scheme of FIG. 3 of a composite layer 1 of polymeric material consisting of polypropylene and in which glass fibres are mixed.

The composite layer 1 has a surface weight of 600 g/m$^2$. The coating layer 2 coupled to one face of the composite layer 1 comprises a non-woven fabric of flame-retardant fibres having a surface weight of 120 g/m$^2$. The covering layer 3 laminated to the other of the faces of the composite layer 1 comprises a non-woven flame-retardant fibre fabric having a surface weight of 120 g/m$^2$.

The minimum deep-drawability achieved in the thermoforming process is equal to 40% in both directions (longitudinal and transverse with respect to the direction of production).

The combustion speed value, measured as flame propagation speed in mm/min (according to DIN 75200 method) is 0 mm/min.

Example 6

Thermoformable Plate with High Deep-Drawing, Low Surface Weight and Low Burning Speed.

The plate consists, according to the scheme of FIG. 3, of a composite layer 1 of polymeric material consisting of polypropylene and mixed, as fibres, with lamellar mica particles.

The composite layer 1 has a surface weight of 600 g/m$^2$. The coating layer 2 coupled to one of the faces of the composite layer 1 comprises a non-woven fabric of flame-resistant fibres having a surface weight of 120 g/m$^2$. The covering layer 3 laminated to the other of the faces of the composite layer 1 comprises a non-woven flame-resistant fibre fabric having a surface weight of 120 g/m$^2$.

The minimum deep-drawability achieved in the thermoforming process is equal to 40% in both directions (longitudinal and transverse with respect to the direction of production).

The combustion speed value, measured as flame propagation speed in mm/min (according to DIN 75200 method) is 0 mm/min.

In a possible execution variant, the coating layers 2 and 3 can be a polymer coating layer or a firewall layer, respectively.

In an embodiment the two coating layers 2 and 3 are both a polymeric coating layer or a firewall layer, or the coating layers 2 and 3 on the respective faces of the layer 1 may be different from each other.

The differences between the coating layers 2 and 3 may also consist not only of different materials alternatively or in combination but also of layers with different thickness and/or surface weight and this even when the coating layers 2 and 3 are of the same material.

As with the thickness measurement of cladding layer 2, the thickness of cladding layer 3 falls within the range of the table corresponding to the material of which it is made according to the different variants provided.

With reference to the variants of the embodiment of FIG. 2, it is clear that the properties of the plate formed by the combination of said layers are modified according to a more progressive scale in relation to the combination of the type of cladding layers 2 and 3 chosen.

Thus, it is evident that when the coating layers 2 and 3 are both constituted by a polymeric coating layer, the impact strength is substantially increased, maintaining the high thermoformability of the plate and the low specific weight.

In addition, by providing that cladding layers 2 and 3 are both non-metallic firewall layers, a plate is generated that is easily thermoformed, but at the same time has high impact strength and firewall properties.

By combining the two types of cladding layers 2 and 3, it is possible to adjust and combine various properties of the plate.

For example, by providing on one side of the composite layer 1 a layer of polymeric coating and on the other side a layer of firewall, it is possible to obtain a plate having a trade-off between the plate with only layers of polymeric coating and the plate with only layers of firewall, thus giving to a plate having high impact strength also a considerable fire resistance without excessively aggravating on the weight, i.e. on the specific weight and without excessively compromising the ability of the plate to be subjected to three-dimensional forming processes.

Obviously, the forms of execution illustrated are to be considered only as examples and not as limitations, since it is possible to envisage even different combinations of several layers directly overlapping and/or alternating with each other, such as, for example, several composite layers 1 and/or several coating layers 2 and/or 3 according to one or more of the various types described above or according to combinations or sub-combinations of these types. Furthermore, in combination or alternatively, it is also possible to provide further layers of different materials and with different functionalities for the plate object of the present invention.

The invention claimed is:

1. A composite plate comprising:

a first layer of thermoplastic material, which is coupled on at least one face with a second layer of material by chemical-physical adhesion, wherein said first layer of thermoplastic material comprises a mixture of a matrix of a thermoplastic material and non-vegetal fibers or particles having an aspect ratio of at least one dimension to at least one other dimension greater than 9 in case of needle-shaped fibers, or 40-70 in case of lamellar particles, which are present as clusters or bundles of a predetermined length and form a three-dimensional structure of contiguous elements layered together, and wherein said second layer is coating of synthetic or natural fibers bound together mechanically or a physico-chemical processes, further comprising a third layer comprising a woven or non-woven fabric.

2. The composite plate according to claim 1, wherein said second layer comprises a polymeric film providing an aesthetic coating, a protection coating, or adhesion to an additional layer.

3. The composite plate according to claim 1, wherein said woven or non-woven fabric comprises vegetable fibers, mineral fibers, synthetic fibers, or a combination thereof.

4. The composite plate according to claim 1, wherein said woven or said non-woven fabric is made of fibers having flame-retardant properties.

5. The composite plate according to claim 1, further comprising at least one additional layer comprising a polymeric film providing an aesthetic coating, a protection coating, or adhesion to an additional layer, or comprising a woven or non-woven fabric.

6. A composite plate comprising:

a first layer of thermoplastic material, which is coupled on at least one face with a second layer of material by chemical-physical adhesion, wherein said first layer of thermoplastic material comprises a mixture of a matrix of a thermoplastic material and non-vegetal fibers or particles having an aspect ratio of at least one dimension to at least one other dimension greater than 9 in case of needle-shaped fibers, or 40-70 in case of lamellar particles, which are present as clusters or bundles of a predetermined length and form a three-dimensional structure of contiguous elements layered together, wherein said second layer is coating of synthetic or natural fibers bound together mechanically or a physico-chemical processes, and wherein said first layer has a weight per unit area between 400 and 1800 g/m$^2$.

7. A composite plate comprising:

a first layer of thermoplastic material, which is coupled on at least one face with a second layer of material by chemical-physical adhesion, wherein said first layer of thermoplastic material comprises a mixture of a matrix of a thermoplastic material and non-vegetal fibers or particles having an aspect ratio of at least one dimension to at least one other dimension greater than 9 in case of needle-shaped fibers, or 40-70 in case of lamellar particles, which are present as clusters or bundles of a predetermined length and form a three-dimensional structure of contiguous elements layered together, wherein said second layer is coating of synthetic or natural fibers bound together mechanically or a physico-chemical processes, and wherein said second layer has a weight between 20 and 200 g/m$^2$.

8. The composite plate according to claim 1, wherein the third layer has a weight between 60 and 400 g/m$^2$.

9. The composite plate according to claim 1, wherein said three-dimensional structure of the first layer comprises at least some of the fibers and/or the lamellar particles which are arranged in a direction parallel to a direction of extrusion of the composite plate due to a mechanical action exerted by the extrusion on said fibers and particles.

10. The composite plate according to claim 8, wherein said three-dimensional structure exhibits a ratio of fiber distribution of the fibers having an orientation parallel to faces of the plate and/or to a direction of extrusion to the fibers oriented in a direction perpendicular to the faces of the plate, or to the direction of extrusion, which varies along a depth of the composite plate in a direction of a thickness of said first layer, and wherein the lamellar particles have a homogeneous orientation along the entire thickness of the first layer.

11. The composite plate according to claim 9, wherein a percentage of distribution of fiber orientations relative to the faces of the composite plate and/or the direction of extrusion is in a range from 1:1 to 6:1.

12. The composite plate according to claim 11, wherein more than half of the fibers within said first layer has an orientation between +60° and −60°.

13. The composite plate according to claim 1, wherein the fiber clusters or bundles comprise individual fibers adhering to each other and having a diameter between 5 and 50 microns and a length between 1 and 20 mm, said fiber clusters or bundles being shaped as cylinders having a thickness between 0.5 and 2 mm, and a length between 0.5 and 4 mm.

14. The composite plate according to claim 1, wherein the thermoplastic material of the first layer is selected from the group consisting of polyethylene, polypropylene, or mixtures of polyolefins, and wherein the non-vegetal fibers comprise glass fibers.

15. The composite plate according to claim 1, wherein the lamellar particles comprise lamellar particles of mica, vermiculite, or graphite.

16. The composite plate according to claim 1, wherein the lamellar particles have a nanometric thickness.

17. The composite plate according to claim 4, wherein the third layer has a weight between 60 and 400 g/m$^2$.

* * * * *